of low molecular weight polymers of methacrylic and acrylic esters formulated with wetting, emulsifying, plasticizing or coalescing agents as aqueous finish compositions for hard surfaces. The polymers have molecular weights between 700 and 5000 and acid numbers between 50 and 275. The finishes produced by the compositions are water clear and are self-dispersible. Thus, on reapplication, the previous film is dissolved, the embedded soil removed and a fresh film left.

United States Patent [19]

Lewis et al.

[11] 4,168,255

[45] Sep. 18, 1979

[54] OLIGOMERIC AQUEOUS FINISHES

[75] Inventors: Sheldon N. Lewis, LePlan de Grasse, France; Richard A. Haggard, Ft. Washington; David R. Gehman, Harleysville, both of Pa.

[73] Assignee: Rohm and Haas Company, Philadelphia, Pa.

[21] Appl. No.: 676,587

[22] Filed: Apr. 13, 1976

Related U.S. Application Data

[63] Continuation-in-part of Ser. No. 467,353, May 6, 1974, abandoned, and a continuation-in-part of Ser. No. 516,062, Oct. 21, 1974, abandoned.

[51] Int. Cl.² .............................................. C08L 33/02
[52] U.S. Cl. ...................... 260/29.6 H; 260/29.6 BE; 427/385 R
[58] Field of Search .................. 260/29.6 H, 29.6 BE; 427/385

[56] References Cited

U.S. PATENT DOCUMENTS

| | | | |
|---|---|---|---|
| 4,013,607 | 3/1977 | Dwyer et al. | 260/29.6 TA |
| 4,103,093 | 7/1978 | Lewis et al. | 260/29.6 |

*Primary Examiner*—M. J. Welsh
*Attorney, Agent, or Firm*—Harold L. Greenwald

[57] ABSTRACT

This invention discloses the composition and use of salts

33 Claims, No Drawings

OLIGOMERIC AQUEOUS FINISHES

CROSS REFERENCES TO RELATED APPLICATIONS

This application is a continuation-in-part of application Ser. No. 467,353 filed May 6, 1974, now abandoned, and Ser. No. 516,062 filed Oct. 21, 1974, now abandoned.

BACKGROUND OF THE INVENTION

This invention relates to the use of salts of low molecular weight polymers of methacrylic and acrylic esters as sole vehicles for the formulation of aqueous, high gloss, essentially water clear finishes with autoredispersible properties. For example, the polymers are used in aqueous polishes for solid substrates such as floors, walls, furniture, doors, trim and appliances. The substrates may be bare, e.g., bare metal, wood, plastic, mineral such as stone, brick, concrete or other composite including vinyl, rubber and asbestos tile, or the substrates may be painted, varnished, lacquered, papered or coated by other materials producing a hard surface. These low molecular weight polymers, also known as oligomers, are particularly well adapted to the formulation of a wide variety of autoredispersible finishes which on application and drying form clear coatings having a glossy appearance. Illustrative of the variety are (1) water resistant, detergent sensitive household floor polishes, (2) water resistant, detergent resistant industrial floor polishes, and (3) hard surface cleanser and polish for use on all wall surfaces.

It is known to employ as protective coatings, particularly as floor coatings, compositions containing aqueous polymeric dispersions of water-insoluble emulsion copolymers, as the vehicle, in admixture with a wax, an alkali-soluble resin, wetting, emulsifying and dispersing agents, and a polyvalent metal compound. The water-insoluble emulsion copolymers, which are used as the vehicle in these coatings, are high in molecular weight by their nature. These polish compositions have a particularly advantageous balance of properties, including high gloss coupled with detergent resistance, recoatability and good removability.

Other conventional polishes continue to build up on reapplication to the floor or other solid substrate and ultimately require a laborious, objectionable stripping operation to restore a uniformly clean floor. The polish films based on products from this invention are selfdispersible. During polish reapplication, the previous film is dissolved and the embedded soil removed, leaving a film which on drying is comparable in thickness to the original film. Thus, without film buildup, the three separate steps normally involved in maintenance are accomplished (cleaning, stripping previous coats of polish and repolishing) in a single step.

The hard surface cleaner-polish of this invention differs from conventional all-purpose cleaners in leaving a film on the cleaned surface. This film restores the luster of the surface and seals it, making the substrate more resistant to new soil. The film, formed on drying, is soluble and dispersible in fresh cleaner-polish, so on recleaning, the old film dissolves, releasing accumulated soil. Use of the cleaner-polish thus results in less scrubbing effort in cleaning as well as reducing the wear and damage to the substrate by facilitating the removal of oily and greasy soils, particulate dirt, water-soluble matter and other types of household soils.

Other polymers of relatively low molecular weight and aqueous alkali solubility, such as rosin acid adducts, styrene/acrylic acid, and styrene/maleic anhydride resins, are found to impart good leveling and flow properties to polishes containing higher molecular weight polymeric vehicles but are unsatisfactory when used solely as the major polymeric constituent in aqueous soluble floor polishes. Their defects include: unacceptable low water resistance, unsatisfactory recoatability, poor wear properties, and poor initial color and color stability. Although the addition of low levels of polyvalent metal ions (e.g., Zn) may be used to improve these properties, it does so at the expense of gloss, so polishes based on those other polymers remain inferior to polishes of the polymers disclosed herein.

BRIEF SUMMARY OF THE INVENTION

We have found an aqueous composition producing a finish with an excellent balance of properties based on a low molecular weight polymer. The aqueous polishing compositions of the present invention can generally be defined in terms of the following proportions of the main constituents:

(A) about 25 to 100 parts by weight of an addition polymer comprising mers derivable from an $\alpha,\beta$-monoethylenically unsaturated acid and at least 25 mole percent of mers having the structure

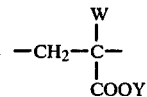

wherein W is hydrogen or methyl, Y is alkyl or substituted alkyl; the polymer having an acid number from about 50 to about 275, a weight average molecular weight from about 700 to about 5000, and being at least partly neutralized;

(B) 0 to about 25 parts by weight of a wax;

(C) 0 to about 50 parts by weight of an alkali-soluble resin;

(D) about 0.1% to about 90% by weight of the sum of (A), (B) and (C) of one or more wetting, emulsifying, plasticizing or coalescent agents;

(E) 0 to about 5% by weight of (A) of a polyvalent metal compound; and (F) water to make the total solids 1% to 45% by weight.

In a preferred embodiment, the aqueous finish composition comprises (A) an at least partly neutralized polymer having mer units of methacrylic acid and at least one ester of methacrylic acid, having an average carboxyl content of at least about 2, an average chain length, $\bar{n}$, of from about 6 to about 35 mer units per molecule, and (B) one or more agents selected from the group wetting, emulsifying, plasticizing and coalescing agents in the amount of 0.1% to 90% of (A) by weight. This polymer is an alkoxide-polymerized polymer with a narrow molecular weight distribution having at least about 85% by weight of the molecules with chain lengths of about $\sqrt{2\bar{n}}$ to about $2\bar{n}$ mers.

DETAILED DESCRIPTION OF THE INVENTION

Addition Polymer

The predominant synthetic route to the preparation of polymers of the esters of acrylic acid and methacrylic acid is via free-radical initiation in homogeneous medium, as in bulk or solution polymerization, or in heterogeneous systems, such as emulsion and suspension polymerization. To produce polymers with molecular weights below 5000, it is well-known in the art to use chain transfer agents and, if necessary, high concentrations of the free-radical initiator and high temperatures during the polymerization. In the case of free-radical emulsion polymerization, particularly high concentrations of chain transfer agent are needed since the usual molecular weights without chain transfer are very high, being of the order of one or several millions. The preparative processes are well-known and are described in Encyclopedia of Polymer Science and Technology (John Wiley & Sons, 1964) Volume I, pages 263–280, by L. Luskin and R. Myers, herein incorporated by reference. The polymers of this invention made by free-radical or other initiation procedures are characterized by having a molecular weight from about 700 to about 5000, an acid number from about 50 to about 275, and an average carboxyl content above 2, preferably from about 2 to about 5.

The preferred class of polymers of this invention are those prepared by hydrolysis of the polymers of methacrylate esters previously described in U.S. Ser. No. 371,921 filed June 30, 1973, now abandoned, and U.S. Ser. No. 517,337 filed Oct. 23, 1974, which applications are incorporated herein by reference. The alkoxide-initiated polymers taught in the referenced applications have very narrow molecular weight distributions which are associated with certain desirable rheological properties in the coating and with a desirably very low amount of volatile matter because of the absence of extremely low molecular weight polymer impurities. As a further preference, these anionic polymers have an average chain length, $\bar{n}$, from about 6 to about 35 mer units, at least about 85% by weight of the molecules have chain lengths of about $\sqrt{2\bar{n}}$ to about $2\bar{n}$ mers.

As will be outlined further below, these polymers serve to enable formulations to be prepared which are optimized for different types of polishes. Table I illustrates the versatility of these polymers by showing the preferred range of parameters for each of two types of finishes. The numbers in parentheses represent a preferred range of the given property. When the alkoxide-initiated polymers are used, an even narrower range of molecular weights and, in general, lower average molecular weights are useful. Thus, with these polymers, due to their extremely narrow molecular weight distribution, two ranges of more highly preferred average molecular weights are useful to teach the more desirable ways of using this invention. These ranges are: for the household floor polish recited in Table I, an average molecular weight of 1000 to 2000, with 1300 to 1800 being preferred; for the industrial floor polish, an average molecular weight of 1500 to 3000, with 2000 to 2500 being preferred; for a wall cleaner and polish, 700 to 3500, with 1000 to 1700 being preferred.

We have found that salts of the bis-, tris-, tetra- and higher carboxyl containing methacrylate polymers must fall within specific molecular weight ranges and acid number ranges to afford improved finishes. The acid number is the number of milligrams of potassium hydroxide required to neutralize the acidic constituents in one gram of the acid form of the polymer the acid number range for the polymer is given in Table I as 50 to 80 for the industrial polish and 80 to 150 for the household polish, corresponding to 50 to 150 for the overall range. This acid number range is encompassed by about 6% to about 23%, by weight, of acrylic, methacrylic or itaconic acids or a mixture thereof; these being the preferred acid monomers of this invention.

TABLE I

| Property | Autoredispersible Polishes | |
|---|---|---|
| | Household Floor Polish | Industrial Floor Polish |
| Detergent Sensitivity | Sensitive | Resistant |
| Acid Number | 80–150 | 50–80 |
| | (100–135) | (55–70) |
| Average Molecular Wt. | 1000–5000 | 1500–5000 |
| | (1300–2500) | (2000–4000) |
| Avg. Carboxyls per Molecule | 2.0–4.5 | 2.0–4.0 |
| | (3.5–4.2) | (2.5–3.5) |

The polymers of component (A), supra, may be obtained by polymerization of one or more monoethylenically unsaturated monomers including acrylic esters of acrylic or methacrylic acid wherein the alcohol moiety of the ester is derived from benzyl alcohol, phenol, or a saturated monohydric aliphatic alcohol, especially an alkanol having 1 to 18 carbon atoms, such as cyclopentanol, cyclohexanol, methanol, ethanol, n-propanol, isopropanol, n-butanol, isobutanol, sec-butanol, tert-butanol, any of the pentanols, hexanols, octanols, decanols, dodecanols, hexadecanols, and octadecanols. Preferred polymers are copolymers containing at least one of these esters of acrylic acid with one or more monomers selected from the group consisting of $(C_1-C_4)$alkyl methacrylates, acrylonitrile, methacrylonitrile, vinyl acetate, styrene, vinyltoluene (o, m, or p), vinyl chloride or vinylidene chloride. In place of part or all of the acrylic acid ester component, the preferred type of polymer may contain a $(C_5-C_{18})$alkyl methacrylate. Blends of these copolymers may be used. The polymers may also be graft copolymers including grafts of the monomers mentioned on shellac. The acid mers may be obtained by hydrolysis of methacrylate or acrylate ester mers or by copolymerization of acrylic or methacrylic acids, for the purpose of making the coatings deposited therefrom readily removable by the application of alkaline media, such as dilute aqueous ammonia.

The free-radical initiated polymers are made by any of the well-known polymerization processes (see "Polymer Processes," C. E. Schildknecht ed., Interscience Publishers, New York, 1956), solution polymerization being preferred. Low molecular weight polymers are obtained by employing chain transfer and high polymerization temperature procedures.

The alkoxide-initiated preferred polymers of this invention have the following structural formula:

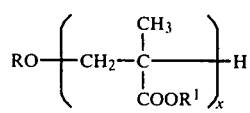

wherein RO is a residue of a chain-regulating alcohol; $R^1$ is alkyl, substituted alkyl or a positively charged counterion derived from an alkali metal, hydrogen, ammonia or an amine; X is an integer; and the average value of x is from about 6 to about 35. The polymers are at least partly neutralized, so have associated charged counterions, for example, cations derived from an alkali metal such as sodium, potassium and the like, ammonia or an amine such as an alkanolamine including dimethylethanolamine, diethylethanolamine, triethanolamine, N-methylmorpholine and the like, and the hydrogen-derived proton or hydrogen ion. The term counterion means the ion of opposite charge from that of the polymer; in this case, opposite from that of the negatively charged carboxyl ions of the polymer. The preferred alkyl and substituted alkyl groups are those previously described in U.S. Ser. Nos. 371,921, now abandoned, 517,337, and 517,336, which applications are incorporated herein by reference.

A preferred procedure for preparing the alkoxide-initiated polymers is by a two-stage process. In the first stage of the reaction, the polymer having all ester functions and a low molecular weight distribution is prepared by a batch or gradual addition technique using from about 15 to about 60% by weight of the total monomer charge and using a relatively high alcohol concentration, generally in the range of from about 20 to about 50 mole percent of the initial monomer charge. After a hold period, the remainder of the monomer charge is added to the reaction mixture. The addition of the remaining monomer is exothermic and leads to a revised molecular weight distribution. The reaction is generally conducted at a temperature in the range of from about 40° to about 130° C. and preferably at a temperature in the range of from about 60° to about 95° C. Although the polymerization can be conducted without a solvent, improved yields are obtained when a solvent is employed in the later stages of the polymerization. The solvents which may be employed include the aromatic solvents such as toluene, xylene and the like. Catalysts which may be employed include the alkoxides, for example, the alkali metal alkoxides, such as sodium alkoxide, potassium alkoxide and the like, including sodium methoxide, potassium methoxide, potassium tert-butoxide and the like, at a concentration in the range of from about 0.4 to about 4 mole percent and preferably from about 0.6 to about 3 mole percent based on the total monomer charge.

The bis-, tris-, tetra- and higher acids of these oligomers may be prepared by treating the oligomeric esters with a base such as an alkali metal base, including sodium hydroxide, potassium hydroxide and the like. The conversion of the oligomeric esters to the mono- and biscarboxyl polymers is relatively rapid and generally occurs within one hour at a temperature in the range of from about 70° to about 75° C. The tris-, tetra- and higher carboxyl containing oligomers are obtained by further heating the basic reaction mixture at a temperature in the range of from about 80° to about 120° C. for a period of time from about 2 to about 5 hours. The alkali metal salts obtained are either used directly or converted to the free acid by dissolving acid salt in water in the presence of a water-insoluble organic liquid, acidifying the aqueous solution and collecting the organic layer which will contain the desired acid. The acids may then be converted to other bases and employed as sole vehicles. Examples of some other bases include those obtained from ammonia, amines such as alkanolamines including dimethylethanolamine, diethylethanolamine, triethanolamine, N-methylmorpholine and the like.

Alternatively, the oligomeric esters may be hydrolyzed by other procedures, including acid-catalyzed hydrolysis, to produce the oligomeric acids.

Optional Constituents

The polyvalent metal compound, if employed in the floor polish formulation, may be either a metal complex or a metal chelate. The polyvalent metal ions may be those of beryllium, cadmium, copper, calcium, magnesium, zinc, zirconium, barium, strontium, aluminum, bismuth, antimony, lead, cobalt, iron, nickel or any other polyvalent metal which can be added to the composition by means of an oxide, hydroxide, or basic, acidic or neutral salt which has appreciable solubility in water, such as at least about 1% by weight therein. The selection of the polyvalent metal and the anion are governed by the solubility of the resultant metal complex in order to insure adequate clarity of the final formulated polish. Zinc and cadmium are especially preferred polyvalent metal ions. The ammonia and amine complexes (and especially those coordinated with $NH_3$) of these metals are particularly useful. Amines capable of complexing include morpholine, monoethanolamine, diethylaminoethanol and ethylenediamine. Polyvalent metal complexes (salts) of organic acids that are capable of solubilization at an alkaline pH may also be employed. Such anions include acetate, glutamate, formate, carbonate, salicylate, glycollate, octoate, benzoate, gluconate, oxalate, lactate and the like. Polyvalent metal chelates wherein the ligand is a bidentate amino acid such as glycine or alanine may also be employed. The polyvalent metal compound must be such that the metal is available to serve its crosslinking function, i.e., it is dissociable to form polyvalent metal containing ions.

Preferred polyvalent metal compounds, complexes and chelates include zinc acetate, cadmium acetate, zinc glycinate, cadmium glycinate, zinc carbonate, cadmium carbonate, zinc benzoate, zinc salicylate, zinc glycollate and cadmium glycollate. Although the polyvalent metal compound may be added to the polish composition in dry form such as a powder, it is preferred to first solubilize the polyvalent metal compound using a fugitive ligand such as ammonia. For purposes of this invention, a ligand is considered fugitive if at least a portion of the ligand tends to volatilize under normal film-forming conditions. Since the ammonia may complex with the polyvalent metal compound, a compound such as zinc glycinate or zinc carbonate, when solubilized in dilute aqueous ammonia solution, may be named zinc amine glycinate or zinc ammonium carbonate.

The polyvalent metal compound, when used, is employed in an amount so that in terms of chemical equivalents the ratio of polyvalent metal to the carboxyl of the addition polymer varies from about 0.05 to 0.5 and preferably from about 0.2 to 0.3. This is expressed as the ratio of metal, such as $Zn++$ to $-COO-$ or $-COOZ$ groups, a ratio of 0.5 being stoichiometric; Z representing a positively charged counterion.

If the wax (when used) is separately dispersed, common dispersing agents may be used, but amine salts of a soap, such as ethanolamine oleate or stearate, are also quite useful. Suitable homogenizing mills may be used to assist in forming the dispersion. The waxes or mixtures of waxes which may be used include waxes of a vegetable, animal, synthetic, and/or mineral origin, or mixtures thereof, such as carnauba, candelilla, Fischer- Tropsch wax, microcrystalline wax, lanolin, cocoa butter, cottonseed, stearin, Japan wax, bayberry, myrtle, mace, palm kernel, beeswax, spermaceti, Chinese insect, mutton tallow, polyethylene, oxidized or not and including emulsions, polypropylene, copolymers of ethylene and acrylic esters, waxes obtained by the hydrogenation of coconut oil or soybean oils, and the mineral waxes such as paraffin, ceresin, montan, ozokerite and the like. Care should be taken in selecting the wax if water clarity is desired.

Wax-soluble resins or gums may be substituted for up to 50% of the wax, by weight. Natural or synthetic materials, including terpene-phenolic resins, heat processed (run) Congo, wood rosin, oxidized petroleum wax and the like, are also suitable.

The compositions are adapted to form clear glossy coatings. However, if desired, a colored appearance may be obtained by the introduction of water-soluble or oil-soluble dyes in suitable proportions. Examples of suitable dyes which may be used include iron blues, phthalocyanine blues and greens, and organic maroons. The amount of dye may be varied widely, depending on the effect desired.

Generally, the alkali-soluble resins have acid numbers varying from about 100 to 300 and average number molecular weights ranging from about 500 to about 10,000 and preferably about 800 to 2000. Examples of alkali-soluble resins include styrene or vinyltoluene copolymerized with at least one $\alpha,\beta$-monoethylenically unsaturated acid or anhydride such as styrene-maleic anhydride resins, rosin-maleic anhydride reaction products esterified with polyhydric alcohols, and alkali-soluble alkyds, which are essentially polyesters of aliphatic dicarboxylic acids with aliphatic polyhydric alcohols which may be modified with $C_8$–$C_{18}$ fatty acids and glycerol esters of $C_8$–$C_{18}$ fatty acids. Examples of the dicarboxylic acids include maleic, fumaric, adipic and sebacic acids, including anhydrides thereof. The polyhydric alcohols may be glycerol, pentaerythritol, trimethylolethane and glycols having 2 to 8 carbon atoms including diethylene glycol and triethylene glycol. Other alkali-soluble resins, such as Manila gum, shellac, alkyl acrylate-shellac copolymers containing enough shellac to be alkali-soluble (see U.S. Pat. No. 3,061,564, Example 4), Loba gum, styrene-acrylic acid or styrene-methacrylic acid copolymers containing, for example, 50% by weight of each monomer, maleic anhydride copolymerized with an equimolar amount of diisobutylene and the like.

Wetting, Emulsifying, Plasticizing and Coalescent Agents

For optimum gloss, water and wear resistance, the final polish formulation must contain auxiliary components including sufficient wetting or emulsifying agents and coalescent or film plasticizer solvent to insure uniform film continuity, film toughness and adhesion to the applied substrate. From about 0.5 to 90% by weight of these auxiliary components, based on the weight of oligomer wax and alkali-soluble resins, when the last two are present, is used.

Since the purpose of coalescent or plasticizer solvents is usually to facilitate film formation and since it is not always necessary to impart flexibility to the oligomer composition when it is inherently tough and flexible, as is often the case, a fugitive or semi-fugitive plasticizer is preferred, rather than a permanent plasticizer. However, permanent plasticizers may be used without the production of films having poor wear resistance and poor resistance to water. Plasticizers may also serve as an aid in obtaining clarity and improving gloss. Certain plasticizers, such as tributoxyethyl phosphate, serve also as leveling agents, but this property is normally not needed for the compositions of this invention. Mixtures of fugitive and permanent plasticizers may also be used.

Examples of fugitive plasticizers or coalescents include the monobutyl, monoethyl, monomethyl or other monoalkyl ethers of diethylene glycol or dipropylene glycol, isophorone, benzyl alcohol, diglyme, butyl Cellosolve and 3-methoxybutanol-1. Broadly, these materials may be described as water-soluble, higher boiling (about 150°–200° C.) monohydric and polyhydric alcohols and lower ($C_1$–$C_5$)alkyl monoethers and diethers of glycols and diglycols. When the polymer is prepared by solution polymerization, as disclosed below, if these oxygenated solvents are used in the polymerization, they may serve as fugitive plasticizers in the polish composition, i.e., the polymer solution may be simply diluted with ammonia water to the desired solids content. Such fugitive plasticizers are well-known, as is shown in U.S. Pat. No. 3,467,610.

Examples of essentially permanent plasticizers that are suitable at low levels include benzylbutyl phthalate, dibutyl phthalate, dimethyl phthalate, triphenyl phosphate, 2-ethylhexylbenzyl phthalate, butylcyclohexyl phthalate, mixed benzoic acid and fatty oil acid esters of pentaerythritol, poly(propylene adipate) dibenzoate, diethyleneglycol dibenzoate, caprolactam, tetrabutylthiodisuccinate, butylphthalylbutyl glycolate, acetyltributyl citrate, dibenzyl sebacate, tricresyl phosphate, ethyl toluenesulfonamide, the di-2-ethylhexyl ester of hexamethyleneglycol diphthalate, di(methylcyclohexyl)phthalate, tributoxyethyl phosphate and tributyl phosphate. The particular plasticizer and the amount thereof used are chosen in accordance with the demand for compatibility and efficiency in insuring optimum performance and polish clarity.

Examples of wetting and emulsifying agents which may be added in formulating the polish include alkali metal and amine salts of higher fatty acids having 12 to 18 carbon atoms, such as sodium, potassium, ammonium or morpholine oleate or ricinoleate, as well as the common nonionic surface active agents. Certain fluorocarbon surfactants also act as wetting agents, and these materials are described in U.S. Pat. No. 2,937,098. Additional wetting agent improves the spreading action of the polish.

The nonionic wetting and emulsifying agents include those prepared by the addition of ethylene oxide to compounds containing one or more active hydrogen atoms, such as alkyl phenols, fatty alcohols, fatty acids, fatty mercaptans, fatty amines, fatty amides and polyols. In many cases, the fatty radical is replaced by other types of hydrocarbon radicals in these starting materials. The polyols are often block polymers or copolymers of propylene oxide and/or butylene oxide, so the entire nonionic surface active agent in these cases may be regarded as a block polymer of ethylene oxide attached to the more hydrophobic block polymer or copolymer. More than one block of either type may be present.

It has long been recognized that the wetting and emulsifying efficiency of surface active agents is related to the balance between the hydrophilic or water-loving end of the molecule and the lipophilic or oil-loving end of the molecule. This balance has been defined in terms of a quantity called the hydrophil-lipophil balance or HLB of the surface active agent. The scale of HLB values and procedures for the determination of these values are given in the book "Nonionic Surfactants," edited by Martin J. Schick (Marcel Dekker, Inc., New York, 1967) on pages 606-613, incorporated herein by reference. When the hydrophilic end of the molecule consists of an ethylene oxide block polymer, then the HLB is defined as the weight percent of this oxyethylene block divided by 5.

The preferred nonionic surface active agents are the polyoxyethylene alkyl phenols and the polyoxyethylene alcohols with HLB values between about 5 and about 15, with those of HLB value between about 7.5 and about 12.5 being preferred. The more preferred hydrophobes are the alkyl phenols in which the alkyl group is a saturated $C_8$-$C_{12}$ group and, most preferably, highly branched. The hydrophile has up to about 14 oxyethylene mers, preferably. A particularly good agent is an octyl or nonyl phenol polyoxyethylene adduct with an HLB value between 9 and 11. Two most preferred surface active agents are octyl phenol, with 5 moles of ethylene oxide added to it, and nonyl phenol, with an average of 5½ moles of ethylene oxide added.

Aqueous Finish Compositions

The constituent (A) polymers are generally employed at a range of from 25 to about 99.9% of the total nonaqueous formulation, with the preferred range being in the range of from about 65 to about 99% of the total nonaqueous formulation. When wax is present in the present invention, the relative proportions of the polymer to wax are from 100:0 to 50:50 by weight. The variation on these relative proportions provides for various properties, especially buffing characteristics. The amount of wetting, emulsifying or dispersing, plasticizing and coalescent agents used in the aqueous polish is generally from 0.1 to 90%, preferably 1 to 60%, and most preferably 10 to 35% of the combined weights of the oligomer, wax and alkali-soluble resin. The concentration of the aqueous polish is suitably from 1 to 45% solids and is preferably about 3 to 25% by weight of solids.

When finally formulated as a polish, the composition should have a pH in the range of from about 7.0 to about 11.0. Most advantageously for an autoredispersible polish, its pH is from about 9.0 to about 10.0. Suitable alkaline or buffering agents such as borax, sodium hydroxide, alkali phosphates, silicates or carbonates, ammonia, or amines such as diethylamine, triethylamine, morpholine or triethanolamine may be introduced to adjust the pH to the desired value.

For a non-buffable, self-polishing composition, the wax should not be over 25 parts by weight, preferably up to 15 parts by weight in 100 parts total of polymer plus wax. Satisfactory non-buffable floor polish formulations have been prepared without the inclusion of a wax.

Besides containing the polymer and the coalescent, plasticizing, wetting and/or emulsifying agents, and the optional wax, metal complex, wax-soluble resin and dye mentioned hereinabove, the composition of the present invention may also contain alkali-soluble resins in an amount of from 0% to 50% of the total weight of the copolymer, wax, wax-soluble resin and alkali-soluble resin.

The compositions may be used for impregnating textiles, leather, paper or other porous or fibrous materials. They may also be applied to plastic sheets such as cellophane, polyethylene, Formica, polyethylene terephthalate, saran and the like. They may also be applied to rigid surfaces, including metals such as steel, aluminum, copper, brass, bronze, tin, chromium, wrought iron and the like, and also to wood, stone, masonry, brick, ceramic tile, glass, asbestos cement shingles or siding, terrazzo, cement and concrete surfaces such as floors. The compounds are especially valuable for polishing floors, walls, woodwork, furniture, doors, etc., including those made of wood, linoleum, rubber, metal and plastic tiles, such as linoleum, asphalt, vinyl and vinylasbestos.

For polishing floors, the coating obtained from the composition should have, or develop in a short period of time, a Knoop hardness number of 0.5 to 23 or greater when measured on a film thereof 0.5-2.5 mil thick on glass. This range of hardness provides good resistance to abrasion and wear and can be obtained by the appropriate selection of monomers to be polymerized. The hardness range from 5 to 20 Knoop number is preferred.

The coalescing agent, oligomer and polyvalent metal compound, wax and/or resin when used may be mixed in any order desired.

The polyvalent metal complex, if used, may be incorporated into the composition at any time; generally, however, it is added last.

The compositions have good storage stability. They are applied in the normal manner by, for example, cloths, brushes or mops. They dry rapidly to clear, or if pigmented, colored films, having hard, tough, exceptionally glossy surfaces. There is substantially no discoloration of the films on aging. The application of the compositions to surfaces carrying previously applied coatings of alkali/removable compositions does not remove appreciable amounts of such coatings nor is the viscosity or consistency of the composition of the present invention detrimentally affected. Hence, the compositions go on the surface uniformly and with ease but without streakiness or other irregularities.

The compositions containing oligomers having carboxyl (acid or salt) groups are removable by alkaline detergents. When crosslinking metals are used, the metal crosslinked coating is insoluble in water, ordinary soap solutions and most detergent solutions, and, being soluble in ammonium hydroxide, ammonia solutions are necessary for their removal.

The following analytical method was established to quantitatively define the clarity of the polishing compositions. For purposes of this invention, the terms "essentially water clear" or "substantially clarified" designate the appearance of polishing compositions, containing 15 to 18% solids, having a reading of at least 50% light transmission on a Bausch and Lomb Spectronic 20 Colorimeter that is calibrated to the range of from 0 to 100% with either methanol or distilled water at a wavelength of 600 millimicrons. The terms "water clear" or "clarified" designate the appearance of a polishing composition, containing 15 to 18% solids, having a reading of at least 85%.

Gloss of the dried coatings is determined by both subjective visual means and by a Leeds and Northrup Photovolt Glossmeter (Cat. No. 7664) using a 60° head.

In the test for polish autoredispersibility, a measured amount of test polish is applied to a black vinyl and a sealed black vinyl asbestos tile and allowed to age for one day at room temperature. Autoredispersion is then performed by dispensing a measured amount of the same polish onto the previous coat and spreading it uniformly over two-thirds of the previous coat. After a ten-second delay, the recoated area is rubbed lightly in a cleaning fashion, smoothed out and allowed to dry. Panel is allowed to age for at least two hours before observations are made for leveling, uniformity of gloss, and absolute gloss versus the unredispersed area of the panel. The autoredispersion procedure can be repeated at select time intervals to determine long-term self-sensitivity.

The tack tester is employed to measure surface tack and rate of dry of applied polish films. A coat of 3.0 mils. of polish is applied to the surface of the tile and allowed to sit until apparent dryness (when polish film appears dry and has lost wet look). At this point, the tack tester is placed on the polish film (1" square surface). A 500 gram weight is placed on the one inch square surface and allowed to sit for five seconds and then removed. If more than five seconds are required for the foot to pull completely away from the polish film, the surface is considered to be not tack free; and the test is repeated in one-minute intervals until tack free time is determined. The value is recorded in minutes from application time.

The tack tester apparatus details are: A piece of 1/16" thick × 1" wide × 3¼" long aluminum is bent at an angle so that a 1" square area may be set on the surface of the polish film. The angle of this bend is determined by trial and error processes until it is found that the weight of the upper 2¼" arm section and its angle are such that it will just balance when a 5 gram weight is placed on the 1" square surface on a dry flat substrate.

The one-inch-square foot may be wrapped with 0.00025-inch-thick aluminum foil to provide a readily replaceable clean smooth surface. If foil is employed, it should be in place during calibration of the instrument.

Test methods for the hard surface cleaner-polish included, in addition to those used for other polishes, the following:
A. Materials
 1. 9×9 white vinyl tiles
 2. synthetic soil
 3. red china marker (Blaisdell), lipstick, crayon, or other marker
 4. Gardner washability machine fitted with sponge (Gardner Lab. Inc., Bethesda, Md.)
 5. 2×2 in. 12-ply cheesecloth
B. Soiling—A ½-inch strip of synthetic soil mix is applied the length of the tile with the cheesecloth swatch. Next, a continuous red line is applied 1 inch away and parallel to the soil with china or other marker. Panel is then aged overnight (16–20 hrs) and loose soil is removed with soft tissue.
C. Cleanability—Initial (over unsealed surface)—Using the Washability machine, 10 mls. of cleaner to be tested is poured onto sponge and two cycles are run to wet surface. After a 15-second soak, ~25 cycles are run and 10 more mls. of cleaner are added. Total of 50 cycles is then completed. Residual foam marks are removed by a light wipe with sponge. Marker and soil removal are judged visually.
D. Resoiling and Recleanability—Panels can now be resoiled over cleaned tracks (next to old soil marks) after about 4 hours, and entire procedure repeated. Only 25 cycles are required for recleanability with volume application distributed initially and at about 12 cycles. Marker and soil removal are judged again.

Other test methods employed in the examples are well-known in the art, for example, by the disclosure in U.S. Pat. No. 3,467,610, and Resin Review, Volume XVI, No. 2, 1966, published by Rohm and Haas Company, Philadelphia, Pa. 19105.

The following examples, in which the parts and percentages are by weight unless otherwise indicated, are illustrative of the invention.

EXAMPLE 1

Partially Hydrolyzed Oligomer of Methyl methacrylate (MMA) Prepared by Two Stage Process Step A - Oligomeric Methyl methacrylate To a two-liter, three-necked flask equipped with a stirrer, thermometer and reflux condenser are added, under a nitrogen blanket, toluene (115 g.), methanol (2.4 g.), 30% methanolic potassium methoxide (20.2 g.) and methyl methacrylate (216 g.). The temperature of the reaction mixture rises to 27° C. over a 25 minute period. The mixture is then warmed to 33° C. within 20 minutes and within another 20 minutes the temperature reaches 42° C. and requires cooling. After 40 minutes, the reaction mixture is warmed to maintain the temperature at about 40° C. After 1½ hours, the reaction temperature is increased to 60° C. at which time a solution of methyl methacrylate (649 g.) and toluene (265 g.) is added while maintaining the temperature at 60°–62° C. After a 45 minute hold period, conversion exceeds 99%. An aliquot of the reaction mixture (300 g.) is treated with concentrated sulfuric acid (1.05 g.) and diatomaceous earth (1.5 g.) and filtered to afford a clear, light yellow oil at 70.5% solids. Molecular weight determination by gel permeation chromatography discloses $\overline{M}_w$ 1,700 and $\overline{M}_n$ 1,350–1400.

Step B - Partially Hydrolyzed Oligomer of Methyl methacrylate

Oligomeric methyl methacrylate (1,200 g.) in a two-liter parr bomb fitted with a sampling tube, pressure gauge, stirrer shaft, pressure release valve and hose connection to a dry ice condenser is added sodium hydroxide (161 g., 2.049 m., 50.9%). The bomb is heated by an oil bath at 130°–135° C., with the vent valve opened for ½ hour. The vent valve is then closed and the temperature of the reaction mixture is raised to 110° C. and 14 psi. After two hours, the heating is discontinued and toluene (120 g.) and deionized water (240 g.) is added. When the temperature reaches 80° C. and the pressure zero, the stirring is stopped and the bomb opened. The contents are transferred to a three-liter, three-necked flask. To this is added toluene (306 g.), water (219 g.) and n-butanol (67 g.). The reaction mixture is maintained at 55° C. while formic acid (219.7 g., 2.54 m., 90%) is added over a 15 minute period. Stirring is maintained for an additional 20 minutes and the phases are separated. To the organic phase, in a three-liter flask, are added water (905 g.) and concentrated ammonium hydroxide (11.7 g.). This mixture is heated to reflux to remove the organic distillate. The reaction mixture is cooled to 95° C. and treated with additional ammonium hydroxide (106.9 g.). Stirring is continued for 20 minutes as the solution is cooled to 60° C. The product has the following characteristics: clear and essentially colorless (APHA <100) at 49% solids content; pH 8.7; acid number 123 (100% solids); viscosity <5,000 cps at 25° C.; 3 carboxyls per molecule.

EXAMPLES 2-9

Partially Hydrolyzed Oligomers of MMA Prepared by Two Stage Process

Oligomeric polymers prepared by the two stage process are described in the following table. The preparation of the MMA oligomer of Example 7 is given in detail below. Hydrolysis of the oligomer to the desired carboxyl content is by the procedure of Step B of Example 1.

In the first stage, a clean, dry 3-liter 4-necked glass reaction flask, under $N_2$ blanket; equipped with $N_2$ inlet, paddle stirrer, thermometer, and reflux condenser is charged in the following order:

| | |
|---|---|
| Toluene | 143.6 g. |
| Methanol | 1.8 g. |
| Potassium methoxide (28.4%) | 27.1 g. |
| Methyl methacrylate | 277.6 g. |

The potassium methoxide is 28.4% in methanol.

With agitation, the hazy, gray-white mixture exotherms slowly to 38° C. in 55 min., and becomes slightly yellow. The exotherm increases raising the temperature to 62° C. in the next 7 minutes. Cooling with a room temperature air blast is required for another 7 minutes. The batch becomes a rich orange color of increased viscosity. Heat is supplied to maintain 60°-65° C. temperature for a 1-hour hold period.

Second stage addition, consisting of a solution of 1316.4 g. of MMA and 719.9 g. toluene begins after the above hold. Cooling requirements by air blast increase substantially during the 4 hour addition period. A 17 minute sustained post-addition exotherm is held at 62° C. with air blast cooling. The batch, now a moderately viscous (est. >500 cps. at 60° C.) orange oil is held at 60° C. for 45 minutes after addition, then poured into a suitable container.

142 Grams (containing 6.2 meq. total base, 0.044 meq./g.) are quenched with 0.33 g. of 96% $H_2SO_4$ (6.4 meq.$H^+$) and agitated at 50° C. with 0.7 g. Hyflow Filter cel, and pressure filtered to give a clear, light yellow oil at 67% solids, APHA color 80. Molecular weight determination by gel permeation chromatography discloses $\overline{M}_w$ 2510, $\overline{M}_n$ 1890, $\overline{M}_w/\overline{M}_n$ ca. 1.3, with 90 wt. % distribution between 1000 and 5000.

| Ex. | $\overline{M}_w$ | Approx. Carboxyl Content | Actual Acid Number | Approx. % of Oligomer Equivalent | |
|---|---|---|---|---|---|
| | | | | MMA | MAA |
| 2 | 1600 | 3.8 | 123 | 81 | 19 |
| 3 | 1600 | 2.9 | 98 | 85 | 15 |
| 4 | 1350 | 4.5 | 160 | 75 | 25 |
| 5 | 1350 | 3.1 | 120 | 81 | 19 |
| 6 | 2000 | 2.9 | 81 | 87 | 13 |
| 7 | 2500 | 2.6 | 60 | 90 | 10 |
| 8 | 1050 | 2.5 | 150 | 76 | 24 |
| 9 | 700 | 2.9 | 262 | 59 | 41 |

EXAMPLE 10

Oligomeric Methyl methacrylate/Butyl methacrylate Having a Carboxy Content of 4

Step A - Oligomeric Methyl methacrylate/Butyl methacrylate (75/25 by weight)

To a three-liter, three-necked flask equipped with a condenser, paddle stirrer, thermometer, addition funnel and Y-tube is added, under nitrogen, toluene (60 g.), n-butanol (22.5 g., 0.30 m.), sodium methoxide in methanol (25% solution, 29.4 g., 0.136 m) and potassium methoxide in methanol (30% solution, 12.7 g., 0.055 m.). To this clear solution at 60° C. is added with stirring methyl methacrylate (MMA) (310 g., 3.1 mole) and butyl methacrylate (BMA) (103 g., 0.73 m.) over a 30 minute period. The light yellow mixture is maintained at about 61° C. until the reaction mixture exotherms (about 35 minutes after addition). The temperature is maintained at about 65° C. After the exotherm subsides, there is then added over a one hour period methyl methacrylate (1,067 g., 10.6 m.), butyl methacrylate (355 g., 2.42 m.) and toluene (414 g.) while maintaining the reaction temperature at 60°-63° C. with ice bath cooling. The product obtained at >98% conversion after a ½ hour hold following the second stage addition is oligomeric methyl methacrylate/butyl methacrylate (75/25) of $\overline{M}_w$ ca. 1450, $\overline{M}_n$ ca. 1300, and is employed in the following step without further purification.

Step B - Oligomeric Methyl methacrylate/Butyl methacrylate Having a Carboxy Content of Four To the oligomeric methyl methacrylate/butyl methacrylate of part A (1,000 g., 80.1% oligomer) in a three-liter three-necked flask equipped with a bottom stopcock, reflux condenser, stirrer and thermometer, under a nitrogen atmosphere, at 63° C. is added aqueous sodium hydroxide (185 g., 50.3%). The reaction mixture is held at 73°-78° C. for one hour and then heated to reflux for 4.5 hours. Titration discloses 84% conversion at this point. The yellow viscous oil is cooled and diluted with water (200 g.) and toluene (200 g.). A heterogeneous distillate (400 g.) is removed over a 1½ hour period. To the remaining clear yellow-orange solution is added toluene (200 g.) and the mixture refluxed for 5½ hours. At this time, toluene (200 g.), isobutanol (100 g.) and water (710 g.) are added and the reaction mixture cooled to 50°-60° C. Sulfuric acid (179 g., 97%, 1.78 m.) is added over 15 minutes with cooling. The reaction mixture becomes a white, mobile, two-phased mixture and is agitated an additional 15-20 minutes. After removing the aqueous layer, additional water (700 g.) is added and the reaction mixture heated at 60°-70° C. with sufficient vacuum to remove the toluene. The pressure is adjusted to atmospheric pressure after collecting about 400 g. of distillate while increasing the temperature to 100° C. To the remaining white, two-phased, soft-gum mixture at 90° C. is added aqueous ammonia (148 g., 2.45 m., 28.2%). After two-thirds of the ammonia is added, solubilization occurs. The solution is cooled to 60°-65° C. and the remaining ammonia added. The product solution is clear and pale yellow (APHA color ca. 100); solids are 50% at pH 9.2; viscosity at 25° C. is 20,000 cps and product acid number is 150±5 (100%; representing an average carboxy content of 4).

EXAMPLES 11-18

Other Hydrolyzed Copolymers of Methyl Methacrylate and Butyl Methacrylate

By following substantially the procedure as described in Example 10 there is prepared the following products described in Table I.

TABLE I

Hydrolyzed Copolymers of MMA and BMA

| Ex. No. | $M_w$ | Carboxyl Content | Approx. Product Composition* MMA | BMA | MAA | Actual Acid No. | Solids As Supplied |
|---|---|---|---|---|---|---|---|
| 11 | 1400 | 2.7 | 73 | 10 | 17 | 110 | 48 |
| 12 | 1400 | 4.1 | 67 | 10 | 23 | 149 | 47 |
| 13 | 1500 | 2.8 | 58 | 25 | 17 | 111 | 46 |
| 14 | 1500 | 4.2 | 51 | 25 | 24 | 152 | 46 |
| 15 | 2000 | 3.4 | 75 | 10 | 15 | 97 | 44 |
| 16 | 2200 | 3.3 | 60 | 26 | 14 | 91 | 40.5 |
| 17 | 1500 | 4.4 | 50 | 25 | 25 | 158 | 50 |
| 18 | 1500 | 3.1 | 30 | 50 | 20 | 129 | 39 |

*percent by weight

EXAMPLE 19

Hydrolyzed MMA Polymers in Floor Polish

The oligomers of Examples 2 through 9 are used in household floor polishes of the following formulation:

| | |
|---|---|
| Oligomer at 15% solids in water | 100 parts |
| Diethyleneglycol monoethyl ether | 4 parts |
| Caprolactam | 1 part |
| Fluorocarbon surfactant 1% active ingredient in water (FC-128*, 3M Company) | 1 part |
| Tributoxyethyl phosphate | 0.4 part |
| Ammonia to bring the pH to 9.5 | |

*The formula of this surfactant is $C_8F_{17}SO_2N(C_2H_5)CH_2COOK$

The data in Table II summarize the key application properties of the series of MMA/MAA oligomers evaluated as sole vehicles in these high gloss water clear floor polishes. The data show that water resistant properties decrease with increasing polymer acid concentration and also decrease slightly with decreasing oligomer molecular weight. The data also show that polish gloss properties vary inversely with polymer molecular weight and directly with acid content at equal molecular weight within the scope of this series. At equal molecular weight, film hardness varies directly with degree of hydrolysis of the oligomer which explains the better wear resistance of tetra-acid oligomer polishes over the tris-acid analogs. These experiments indicate that relatively low molecular weight and high acid content is preferred for best gloss and autoredispersibility while a higher molecular weight oligomer offers potential for better water and wear resistance.

In the tables which follow several abbreviations are used: VG=very good, Exc=excellent (i.e. better than very good), Mod=moderate, Sl=slight, V. Sl.=very slight, and C=complete. The symbols + and − are used to indicate "slightly better" and "slightly worse" respectively.

TABLE II

| | Floor Polish Performance Properties of MMA/MAA Oligomers | | | | | | | |
|---|---|---|---|---|---|---|---|---|
| Example No. | 19a | 19b | 19c | 19d | 19e | 19f | 19g | 19h |
| Polymer of Example | 6 | 3 | 5 | 2 | 4 | 7 | 8 | 9 |
| Approx. $M_w$ | 2000 | 1600 | 1350 | 1600 | 1350 | 2500 | 1050 | 700 |
| Acid Number | 81 | 98 | 120 | 123 | 160 | 60 | 150 | 262 |
| Acid Groups/Chain | 2.9 | 2.9 | 3.1 | 3.8 | 4.5 | 2.6 | 2.5 | 2.9 |
| Film Hardness (KHN) | 22 | 19 | 21 | 24 | 24 | — | 20 | 18 |
| Visual Gloss | Good | VG | Exc.− | VG+ | Exc. | Good | Exc. | Exc. |
| 60° Photovolt Gloss | 77 | 81 | 87 | 82 | 89 | 76 | — | — |
| Water Resistance | VG− | VG− | Good | Good+ | Fair− | VG+ | Poor | Poor |
| Autoredispersibility | Good | Good+ | VG | VG | Exc. | Fair | Exc. | Exc. |

The same formulation serves as an industrial floor polish when 2% zinc or oligomer solids, in the form of aqueous $Zn(NH_3)_4CO_3$, is added. The industrial floor polishes produced thereby have improved resistance to water but slightly impaired gloss vis a vis the household polish. Despite the improved water resistance the lowest molecular weight samples produce polishes deficient in this property.

EXAMPLE 20

Effect of BMA Level on Floor Polish Performance

The polymers of Examples 11 thru 18, 2 and 3 are formulated in a household floor polish as follows:

| | |
|---|---|
| Polymer (at 15% in water) | 100.0 parts |
| Diethylene glycol monoethyl ether | 5.0 parts |
| Fluorocarbon surfactant, 1% active ingredient in water (FC-128 3M Company) | 1.0 part |
| Tributoxyethyl phosphate | 0.4 part |
| Ammonia to raise the pH to 9.5 | |

Properties of the polishes are in Table III. In general, black mark resistance, baked film hardness and dirt pickup resistance fall off with increasing butylmethacrylate content. Static water spot and underwater whitening tend to improve with butylmethacrylate content as does gloss on black vinyl asbestos tile.

When formulated as industrial floor polishes by the addition of 2% zinc, on oligomer solids as in Example 19, the coatings exhibit improvement in hardness, water resistance and wear resistance and a small decrease in gloss and autoredispersibility properties when compared with the household polish.

TABLE III

| | Effect of BMA Concentration on Oligomer Performance | | | | | | | | |
|---|---|---|---|---|---|---|---|---|---|
| Example No. | 20a | 20b | 20c | 20d | 20e | 20f | 20g | 20h | 20i |
| % BMA | 0 | 0 | 10 | 10 | 10 | 25 | 25 | 25 | 25 |
| Polymer of Example | 3 | 2 | 11 | 12 | 15 | 13 | 14 | 16 | 18 |
| Acid Number | 98 | 123 | 110 | 149 | 97 | 111 | 152 | 91 | 124 |
| Acid Groups/Chain | 2.9 | 3.8 | 2.7 | 4.1 | 3.4 | 2.8 | 4.2 | 3.3 | 3.1 |
| Approximate $M_w$ | 1600 | 1600 | 1400 | 1400 | 2000 | 1500 | 1500 | 2200 | 1500 |
| Baked Film Hardness (KHN) | | | | | | | | | |

TABLE III-continued

| | Effect of BMA Concentration on Oligomer Performance | | | | | | | | |
|---|---|---|---|---|---|---|---|---|---|
| Example No. | 20a | 20b | 20c | 20d | 20e | 20f | 20g | 20h | 20i |
| 2 Hrs., 105° C. | 19 | 24 | 18 | 19 | — | 17 | 16 | — | 14 |
| Gloss Black Vinyl Asb. | | | | | | | | | |
| Visual | VG⁻ | VG | VG-Exc. | Exc.⁻ | VG | Exc. | Exc.⁺ | Good⁺ | Exc.⁺ |
| 60° Photovolt | 83 | 87 | 91 | 92 | 87 | 93 | 97 | 84 | 98 |
| Water Resistance | | | | | | | | | |
| Static Water Spot | Good | Good⁻ | Good⁻ | Fair | Good⁻ | Good | Fair⁻ | Good⁺ | Good⁺ |
| Whitening Underwater | Mod.⁻ | Mod. | Mod. | Excess. | Mod. | Sl-Mod. | Slight | Slight | Slight |
| Leveling | Exc. | Exc. | Exc. | Exc. | Exc.⁻ | Exc. | Exc. | VG⁻ | Exc. |
| Wear Resistance | | | | | | | | | |
| Black Mark Resistance | Fair | Good | Fair | Fair | — | Poor | Fair | — | Poor |
| Dirt Pickup Resistance | Good | VG | Fair | Fair | — | Poor | Fair | — | Poor |
| Water Clarity | Exc. | Exc. | Exc. | Exc. | Exc. | Exc. | Exc. | Exc. | Exc. |
| Autoredispersibility | | | | | | | | | |
| Gloss | Good⁺ | VG | VG | VG | VG⁻ | VG | VG | VG⁻ | — |
| Leveling | VG | Exc.⁻ | Exc. | Exc. | VG⁻ | VG | Exc. | Good | — |
| Redispersion | C. | C. | C. | C. | C. | C. | C. | C. | — |
| Ghosting | Slight | Nil | Nil | Nil | Nil | Nil | Nil | Nil | — |
| Drag | Slight⁺ | Slight | Slight | V.Sl. | Slight | Slight | V.Sl. | Slight | — |

EXAMPLE 21

Hard Surface Cleaner-Polishes

Hard surface cleaner-polishes are formulated at 4% solids as follows:

| | |
|---|---|
| oligomer (at 45% solids in water) | 6.8 parts |
| water | 91.0 parts |
| octylphenyltetraethoxyethanol | 0.9 part |
| butoxyethoxyethanol | 1.3 parts |
| ammonia to bring the pH to 9.0–9.5 | |

Properties of formulations using four of the oligomeric polymers are given in Table IV. They all perform well as cleaner-polishes with the system of Example 21c having an outstanding balance of properties.

TABLE IV

| Hard Surface Cleaner-Polishes | | | | |
|---|---|---|---|---|
| Example | 21a | 21b | 21c | 21d |
| Polymer of | | | | |
| Example | 2 | 6 | 8 | 9 |
| Acid No. | 123 | 81 | 150 | 262 |
| Approx. M_w | 1600 | 2000 | 1050 | 700 |
| Gloss | Fair | Fair | Good | Good |
| Leveling | VG | VG | VG | VG |
| Initial Cleaning | Fair | Fair | Good | Good |
| Recleaning | | | | |
| Soil | VG | VG⁻ | Exc. | VG |
| Crayon | Fair | Fair | VG | Good |
| Surface Tack | nil | nil | nil | slight |

EXAMPLE 22

Effect of Surface Active Agent HLB Value

By substituting other surface active agents in a formulation similar to that of Example 21, a series of hard surface or wall cleaner-polishes is made in which the surface active agent (SAA) is varied in HLB. Octylphenoxypolyethoxyethanols are chosen differing in the number of oxyethylene mer units to furnish a range of HLB values from 3.6 to 14.6. The polymer used is that of Example 8. The formulation difference from that in Example 21 is in the ratio of polymer to SAA, in this example it is four parts of polymer to one of SAA by weight. The properties of the polish are in Table V. Gloss and leveling become unacceptable at the lowest HLB value; at the high end of the HLB scale a number of properties fall of gradually, especially the initial cleaning properties.

Table V

| | Influence of HLB Value of Surface Active Agent | | | | | |
|---|---|---|---|---|---|---|
| Example | 22a | 22b | 22c | 22d | 22e | 22f |
| SAA.HLB value | 3.6 | 7.8 | 10.4 | 12.4 | 13.5 | 14.6 |
| Gloss | Poor | Fair | Fair | Fair | Fair | Fair |
| Leveling | Fair | Good | VG | VG⁻ | VG⁻ | Good |
| Initial Cleaning Properties | | | | | | |
| Synthetic Soil | Not Tested | Not Tested | Good | Good | Fair | Fair |
| Red Crayon | Not Tested | Not Tested | Fair | Fair | Poor | Poor |
| Lipstick | Not Tested | Not Tested | Good+ | Good | Fair | Fair |
| Recleaning Properties | | | | | | |
| Synthetic Soil | Not Tested | Not Tested | VG | VG⁻ | VG | VG |
| Red Crayon | Not Tested | Not Tested | VG | VG | Good | Good |
| Lipstick | Not Tested | Not Tested | VG | VG | VG⁻ | VG⁻ |
| Gloss | Not Tested | Not Tested | Good | Fair | Fair | Fair |
| Leveling | Not Tested | Not Tested | VG | Good | Good | Good |

EXAMPLE 23

Free Radical Oligomers in Floor Polish

The formulation used in Example 20 is used with oligomers made by free radical initiated solution polymerization to produce household floor polishes and modified with 2% zinc on oligomer solids, as in Example 20, to produce industrial floor polishes. The properties of the floor polishes and description of the oligomers are in Table VI following the format—household polish/industrial polish—for each property entry. As noted in previous examples, zinc improves water and detergent resistance at some sacrifice in autoredispersibility gloss and leveling. The zinc, thus, is desirable in industrial polishes requiring high detergent resistance in an autodispersible polish. In household polishes requiring maximum gloss and leveling, the zinc is not used.

TABLE VI

Free Radical Oligomer Floor Polishes

| Example | 23a | 23b | 23c | 23d | 23e |
|---|---|---|---|---|---|
| Composition of Oligomer* | MMA/BA/HEMA/AA 40/40/10/10 | MMA/BA/MAA 55/30/15 | MMA/St/MAA 70/12/18 | MMA/St/AA/MAA 70/13.5/7.5/9 | MMA/MAA 86/14 |
| $M_w$ | 4970 | 4690 | 3550 | 3640 | 4400 |
| Gloss | VG/VG− | VG+/VG | Exc/− | VG/G | VG/− |
| Leveling | VG/VG | Exc/VG | Exc/− | Exc−/Good+ | Exc/− |
| Water Resistance | F/G | G/VG− | VG/− | G/VG | VG−/− |
| Detergent Resistance | P/F | F/G+ | G+/− | P/G | G/− |
| Autoredispersibility | | | | | |
| DRAG | sl/mod | mil/sl | sl/− | nil/mod | nil/− |
| Redispersion | Comp/Comp | Comp/Comp | Comp−/− | Comp/nil | partial/− |
| Leveling | VG/VG | Exc/G | VG−/− | VG/VG− | VG/− |
| Gloss | VG/G | VG/G | VG+/− | G/VG | VG/− |

*Weight percent of monomers using the following symbols:
MMA = methyl methacrylate,
BA = butyl acrylate,
HEMA = β-hydroxyethyl methacrylate,
AA = acrylic acid,
MAA = methacrylic acid and
St = styrene.

EXAMPLE 24

Other Polish Formulations

| 24a. Formulation With High Gloss and Water Resistance | |
|---|---|
| Oligomer of Example 6 (15% solids in water) | 100 parts |
| Diethylene glycol monoethyl ether | 4 parts |
| Hexylene glycol | 1 part |
| Fluorocarbon surfactant (of Example 19)1% | 1 part |
| Tributoxyethyl phosphate | 0.4 parts |
| Ammonia to raise the pH to 9.5 | |
| 24b. Formulation With Both Alkoxide Initiated and Free Radical initiated Oligomers | |
| Oligomer of Example 23b at 12% solids in water | 70 parts |
| Oligomer of Example 9 at 12% solids in water | 30 parts |
| Fluorocarbon surfactant (of Example 19)1% aq. | 0.5 parts |
| Tributoxyethyl phosphate | parts |
| Ammonia to raise the pH to 9.5 | |
| 24c. Formulation for Detergent Resistant, Autoredispersible Industrial Floor Polish | |
| Oligomer of Example 7 at 14% solids in water | 93 parts |
| Wax (polyethylene)14% solids nonionic emulsion in water (AC392, Allied Chemical Co.) | 7 parts |
| Diethylene glycol monomethyl ether | 5 parts |
| Fluorocarbon surfactant (of Example 19)1% aq. | 1 part |
| Tributoxyethyl phosphate | parts |
| Zn(NH₃)₄(HCO₃)₂ aqueous (8.4% Zn) | 1.5 parts |
| Ammonia to raise the pH to 9.5 | |

We claim:

1. An aqueous finish composition which comprises
(A) an at least partly neutralized alkoxide-polymerized polymer having mer units of methacrylic acid and at least one ester of methacrylic acid, the acid units having been produced by partial hydrolysis of ester units, the polymer having an average carboxyl content of at least about 2, an average chain length, $\bar{n}$, of from about 6 to about 35 mer units per molecule and wherein at least about 85% by weight of the molecules have chain lengths of about $\sqrt{2\bar{n}}$ to about $2\bar{n}$ mers, and
(B) one or more agents selected from the group wetting, emulsifying, plasticizing and coalescing agents in the amount of 0.1% to 90% of (A) by weight.

2. The composition of claim 1 wherein the polymer is a partially hydrolyzed polymer of at least one ester of methacrylic acid and has an average carboxyl content between about 2 and about 5.

3. The composition of claim 2 wherein the polymer salt has the following structural formula:

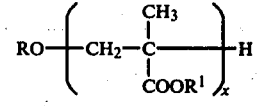

wherein RO is a residue of a chain-regulating alcohol; $R^1$ is alkyl, substituted alkyl or a positively charged counterion derived from an alkali metal, hydrogen, ammonia or an amine; x is an integer; and the average value of x is from about 6 to about 35.

4. The composition of claim 3 wherein the polymer has an acid number from about 50 to about 275 and a weight average molecular weight from about 700 to about 3500.

5. The composition of claim 4 wherein the acid number is from about 50 to about 80 and the weight average molecular weight from about 1500 to about 3000.

6. The composition of claim 4 wherein the acid number is from about 100 to about 135 and the weight average molecular weight from about 1300 to about 1800.

7. The composition of claim 4 wherein the acid number is from about 80 to about 150 and the weight average molecular weight from about 1000 to about 2000.

8. The composition of claim 7 wherein component (B) comprises a nonionic wetting agent having multiple oxyethylene mers and an HLB value between about 5 and about 15.

9. The composition of claim 2 wherein the wetting agent is from about 10% to about 35% of (A) by weight.

10. The composition of claim 9 wherein the wetting agent is nonionic wetting agent having up to about 14 oxyethylene mers.

11. The composition of claim 5 wherein the acid number is from about 55 to about 70, the weight average molecular weight is from about 2000 to about 2500, and the average carboxyl content is from about 2.5 to about 3.5.

12. The composition of claim 6 wherein the average carboxyl content is from about 3.5 to about 4.2.

13. The composition of claim 7 wherein the acid number is from about 80 to about 125, the weight average molecular weight is from about 1000 to about 1700, and the average carboxyl content is from about 3.0 to about 3.5.

14. The composition of claim 13 wherein component (B) comprises an ethylene oxide adduct of an alkyl phenol, having about 14 to about 18 carbon atoms; and the adduct having an HLB value between about 9 and about 11.

15. A method of coating a hard substrate with an aqueous composition consisting essentially of:
(A) about 25 to 100 parts by weight of an addition polymer comprising mers derivable from an α,β-monoethylenically unsaturated acid and at least 25 mole percent of mers having the structure

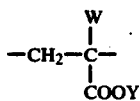

wherein W is hydrogen or methyl, Y is alkyl or substituted alkyl; the polymer being a copolymer of about 6% to about 23% by weight of acrylic or methacrylic acids or a mixture thereof; the polymer having a weight average molecular weight from about 700 to about 5000 and being at least partly neutralized;
(B) 0 to about 25 parts by weight of a wax;
(C) 0 to about 50 parts by weight of an alkali soluble resin;
(D) about 0.1% to about 90% by weight of the sum of (A), (B) and (C) of one or more wetting, emulsifying, plasticizing or coalescent agents;
(E) 0 to about 5% by weight of (A) of a polyvalent metal compounds; and
(F) water to make the total solids 1% to 45% by weight; which comprises the steps of applying a layer of said composition to said substrate and curing the coating.

16. The method of claim 15 in which the polymer of component (A) consists essentially of mers having the structures

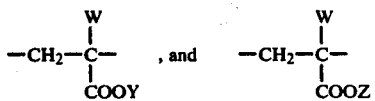

wherein W and Y are as defined in claim 15, Z is a positively charged counterion derived from an alkali metal, hydrogen, ammonia or an amine and optionally a minor amount of mers derived from acrylonitrile, methacrylonitrile, vinyl acetate, styrene, vinyl toluene, vinyl chloride or vinylidene chloride, and the average carboxyl content of the polymer is from about 2 to about 5.

17. The method of claim 16 in which component (A) has an acid number from about 100 to about 135, a weight average molecular weight from about 1300 to about 2500, and an average carboxyl content from about 3.5 to about 4.2; and the hard substrate is a floor.

18. The method of claim 16 in which component (A) has an acid number from about 55 to about 70, a weight average molecular weight from about 2000 to about 4000, and an average carboxyl content from about 2.5 to about 3.5; and the hard substrate is a floor.

19. The method of claim 16 in which component (A) has an acid number from about 80 to about 125, a weight average molecular weight from about 1000 to about 2500, and an average carboxyl content from about 3.0 to about 3.5.

20. The method of claim 19 in which component (D) comprises a nonionic wetting agent having multiple oxyethylene mers.

21. The method of claim 20 in which the wetting agent is from about 10% to about 35% of component (A) and has an HLB value between about 5 and about 15.

22. The method of claim 21 in which the wetting agent has up to about 14 oxyethylene mers.

23. The method of claim 22 in which the wetting agent also comprises an alkyl phenoxy unit, and the hard substrate is a wall.

24. A method of coating a substrate with the composition of claim 1 which comprises the steps of applying a layer of said composition to said substrate and curing the coating.

25. A method of coating a substrate with the composition of claim 4 which comprises the steps of applying a layer of said composition to said substrate and curing the coating.

26. A method of coating a substrate with the composition of claim 5 which comprises the steps of applying a layer of said composition to said substrate and curing the coating.

27. A method of coating a substrate with the composition of claim 6 which comprises the steps of applying a layer of said composition to said substrate and curing the coating.

28. A method of coating a substrate with the composition of claim 7 which comprises the steps of applying a layer of said composition to said substrate and curing the coating.

29. A method of coating a substrate with the composition of claim 16 which comprises the steps of applying a layer of said composition to said substrate and curing the coating.

30. A method of coating a substrate with the composition of claim 14 which comprises the steps of applying a layer of said composition to said substrate and curing the coating.

31. The method of claim 15 wherein the polymer of component (A) is a copolymer of about 10% to about 18% of acrylic or methacrylic acids or a mixture thereof.

32. The method of claim 15 wherein the aqueous composition comprises (E) about 0.05 to 0.5 chemical equivalents of a polyvalent metal per acid mer of the addition polymer.

33. The composition of claim 1 additionly comprising about 0.05 to 0.5 chemical equivalents of a polyvalent metal per acid mer of the polymer.

* * * * *